United States Patent
Enescu et al.

(10) Patent No.: US 10,218,424 B2
(45) Date of Patent: Feb. 26, 2019

(54) REFERENCE SIGNAL INDICATIONS FOR MASSIVE MIMO NETWORKS

(71) Applicant: Nokia Technologies Oy, Espoo (FI)

(72) Inventors: Mihai Enescu, Espoo (FI); Yi Zhang, Beijing (CN); Deshan Miao, Beijing (CN); Yuantao Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/861,406

(22) Filed: Jan. 3, 2018

(65) Prior Publication Data

US 2018/0205440 A1 Jul. 19, 2018

Related U.S. Application Data

(60) Provisional application No. 62/445,950, filed on Jan. 13, 2017.

(51) Int. Cl.
*H04L 27/00* (2006.01)
*H04B 7/06* (2006.01)
(Continued)

(52) U.S. Cl.
CPC ......... *H04B 7/0626* (2013.01); *H04B 7/0417* (2013.01); *H04B 7/0695* (2013.01);
(Continued)

(58) Field of Classification Search
CPC ........ H04B 3/54; H04B 7/0626; H04B 7/066; H04B 7/0413; H04L 27/2613;
(Continued)

(56) References Cited

U.S. PATENT DOCUMENTS

| 2015/0163034 | A1 | 6/2015 | Li et al. |
| 2016/0020880 | A1 | 1/2016 | Li et al. |
| 2016/0043820 | A1* | 2/2016 | Damnjanovic ....... H04L 1/0028 370/329 |
| 2016/0249359 | A1* | 8/2016 | Yamazaki ........... H04W 72/044 |
| 2017/0134134 | A1* | 5/2017 | Lee ..................... H04B 7/0626 |

FOREIGN PATENT DOCUMENTS

| CN | 102281642 A | 12/2011 |
| EP | 2568729 A1 | 3/2013 |

OTHER PUBLICATIONS

"Draft Report of 3GPP TSG RAN WG1 #87 v0.1.0", 3GPP TSG RAN WG1 Meeting #88, R1-17xxxxx, MCC Support, Feb. 13-17, 2017, pp. 1-159.

Sesia et al., "The UMTS Long Term Evolution—From Theory to Practice", Wiley Publication, 2011, 794 pages.

Nsenga et al., "Joint Transmit and Receive Analog Beamforming in 60 GHz MIMO Multipath Channels", IEEE International Conference on Communications, Jun. 14-18, 2009, 5 pages.

(Continued)

*Primary Examiner* — Khai Tran
(74) *Attorney, Agent, or Firm* — Harrington & Smith (57) ABSTRACT

A method is provided including transmitting a reference signal on a downlink beam to a UE; receiving from the UE a reference signal sequence; determining from the received reference signal sequence at least a preferred uplink beam to pair with the downlink beam; sending downlink signaling to the UE on at least the downlink beam; and receiving uplink signaling from the UE on at least the preferred uplink beam. A further method is provided including receiving a reference signal from a network on a downlink beam; selecting at least one preferred uplink beam to match the downlink beam; selecting a reference signal sequence that corresponds to the selected at least one preferred uplink beam; transmitting the selected reference signal sequence to the network; receiving downlink signaling from the network on at least the down- (Continued)

link beam; and transmitting uplink signaling to the network on the at least one preferred uplink beam.

20 Claims, 6 Drawing Sheets (51) Int. Cl.
*H04B 7/0417* (2017.01)
*H04B 7/08* (2006.01)
*H04W 72/04* (2009.01)

(52) U.S. Cl.
CPC ............. *H04B 7/088* (2013.01); *H04B 7/066* (2013.01); *H04W 72/042* (2013.01); *H04W 72/0413* (2013.01)

(58) Field of Classification Search
CPC ............. H04L 25/4902; H04L 1/0026; H04W 72/041; H04W 7/042
USPC ........ 374/259, 267, 316; 370/319, 252, 329; 375/259, 267, 316
See application file for complete search history.

OTHER PUBLICATIONS

"3rd Generation Partnership Project; Technical Specification Group Radio Access Network; Evolved Universal Terrestrial Radio Access (E-UTRA); Physical layer procedures(Release 14)", 3GPP TS 36.213, V14.1.0, Dec. 2016, pp. 1-414.
"WF on NR SRS", 3GPP TSG-RAN Working Group 1 meeting #87, R1-1613369, Agenda: 7.1.3.2, Huawei, Nov. 14-18, 2016, 4 pages.
"3rd Generation Partnership Project; Technical Specification Group Radio Access Network; Evolved Universal Terrestrial Radio Access (E-UTRA); Physical channels and modulation(Release 14)", 3GPP TS 36.211, V14.1.0, Dec. 2016, pp. 1-175.

* cited by examiner

REFERENCE SIGNAL INDICATIONS FOR MASSIVE MIMO NETWORKS

CROSS-REFERENCE TO RELATED APPLICATIONS

The present application claims the benefit under 35 U.S.C. § 119(e) of U.S. Provisional Patent Application No. 62/445,950, filed on Jan. 13, 2017, the disclosure of which is hereby incorporated by reference in its entirety.

TECHNOLOGICAL FIELD

The described invention relates to wireless communications, and more particularly to beam management reference signals such as sounding reference signals (SRSs) in radio networks that support massive multiple input multiple output (m-MIMO) such as the 3GPP New Radio (NR)/5G radio access technology (RAT) being developed to operate in the millimeter-wave (mmWave) spectrum.

BACKGROUND

Wireless radio access technologies continue to be improved to handle increased data volumes and larger numbers of subscribers. The 3GPP organization is developing a new radio system (commonly referred to at this time as $5^{th}$ Generation/5G) to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). m-MIMO systems are characterized by a much larger number of antennas as compared to 4G systems, as well as finer beamforming and a higher antenna gain.

BRIEF SUMMARY

In an example of an embodiment, a method is disclosed that includes transmitting a reference signal on a downlink beam to a user equipment (UE); receiving from the UE a reference signal sequence; determining from the received reference signal sequence at least a preferred uplink beam to pair with the downlink beam; sending downlink signaling to the UE on at least the downlink beam; and receiving uplink signaling from the UE on at least the preferred uplink beam.

According to another example, a computer readable memory is provided tangibly storing a computer program that when executed causes a host radio network access node to perform the method of the previous paragraph.

An example of an apparatus includes one or more processors and one or more memories including computer program code. The one or more memories and the computer program code are configured to, with the one or more processors, cause the apparatus to perform at least the following: transmitting a reference signal on a downlink beam to a user equipment (UE); receiving from the UE a reference signal sequence; determining from the received reference signal sequence at least a preferred uplink beam to pair with the downlink beam; sending downlink signaling to the UE on at least the downlink beam; and receiving uplink signaling from the UE on at least the preferred uplink beam.

In an example of an embodiment, a method is disclosed that includes receiving a reference signal from a radio network on a downlink beam; selecting at least one preferred uplink beam to match the downlink beam; selecting a reference signal sequence that corresponds to the selected at least one preferred uplink beam; transmitting the selected reference signal sequence to the radio network; receiving downlink signaling from the radio network on at least the downlink beam; and transmitting uplink signaling to the radio network on the at least one preferred uplink beam.

According to another example, a computer readable memory is provided tangibly storing a computer program that when executed causes a host user equipment to perform the method of the previous paragraph.

An example of an apparatus includes one or more processors and one or more memories including computer program code. The one or more memories and the computer program code are configured to, with the one or more processors, cause the apparatus to perform at least the following: receiving a reference signal from a radio network on a downlink beam; selecting at least one preferred uplink beam to match the downlink beam; selecting a reference signal sequence that corresponds to the selected at least one preferred uplink beam; transmitting the selected reference signal sequence to the radio network; receiving downlink signaling from the radio network on at least the downlink beam; and transmitting uplink signaling to the radio network on the at least one preferred uplink beam.

DETAILED DESCRIPTION

The embodiments below are in the context of a 5G radio system but this is only an example radio environment and not a limit to the broader teachings herein. Since these teachings are directed primarily to the exchange between the radio network and the UE, the network side of this exchange will be described with reference to a gNB or more generally a base station, recognizing that such a base station may be implemented as a gNB that itself may be implemented as a BBU with one or more distributed RRHs such as described below with reference to FIG. 1 for example.

Figure 1:
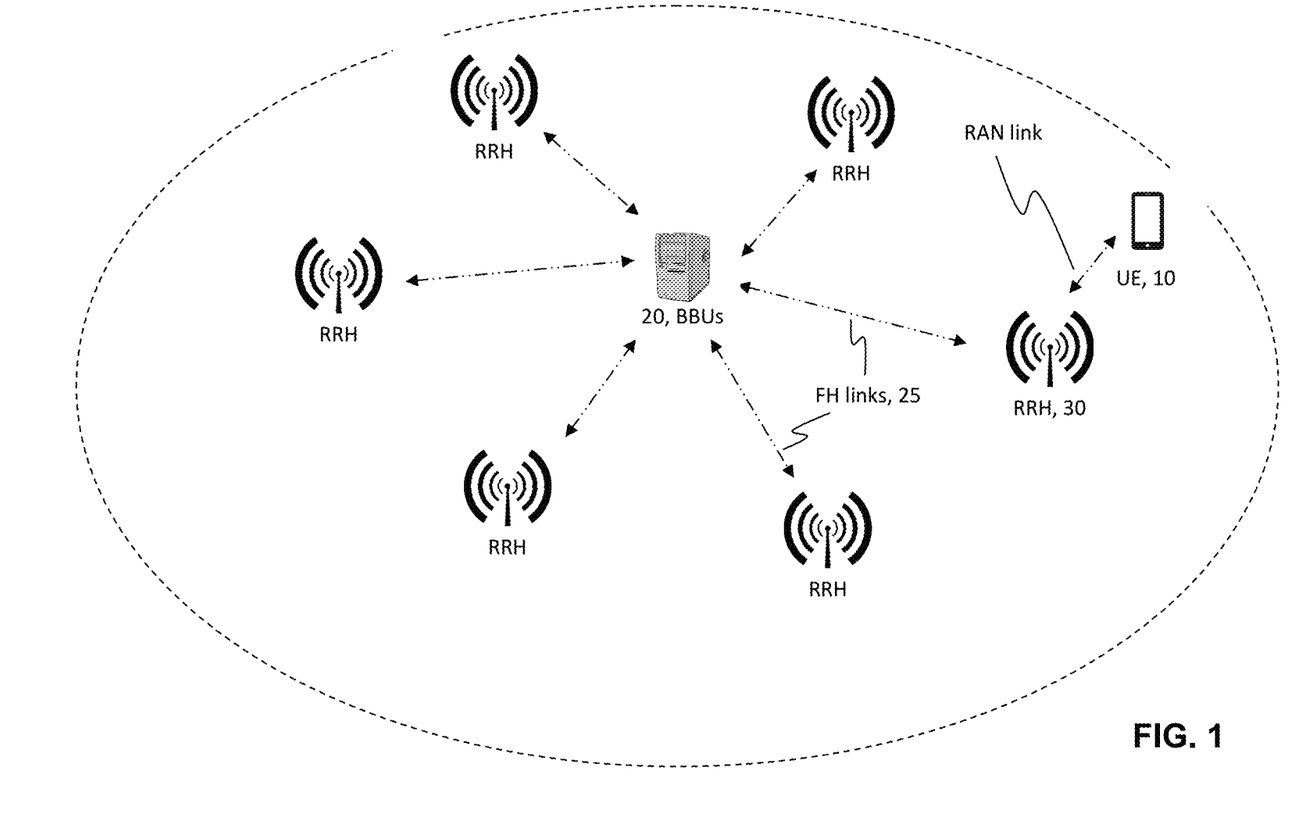
FIG. 1 is a plan view illustration of a NR/5G radio environment in which embodiments of these teachings may be practiced to advantage.

FIG. 1 is a schematic overview of an example 5G radio environment in which these teachings may be deployed. Rather than a conventional unitary cellular base station/eNB the 5G system is to have the conventional base station's functionality distributed among a baseband unit (BBU) 20 (which may be implemented as a single BBU or multiple interconnected BBUs) and one or typically multiple remote radio heads (RRHs) 30 each located up to a few kilometers from the BBU 20. Each RRH 30 is operationally connected to its BBU 20 via a wired or wireless bidirectional transmission link 25 referred to as a front haul (FH) link. Currently the BBU/RRH combination in 5G systems is referred to as a gNB. The UE 10 is in direct communication with one or more of the RRHs 30, which in the 5G system would be operating as a transmission/reception point (TRP) of the gNB. The UE 10 may have active connections to more than one RRH 30. There is a somewhat similar distribution of access node functionality in cloud-based radio access networks (C-RAN) that are currently being deployed at least for some LTE-based networks, though those systems typically use a different terminology than BBU and RRH.

In conventional cellular radio access networks SRS is used for beam management and acquisition of uplink and downlink channel state indications (CSI). Following are a few background references as to MIMO and SRS in the LTE system:

Chapters 11 and 29 of *LTE—The UMTS Long Term Evolution—From Theory to Practice, 2d Ed.* [edited by Stefania Sessia, Issam Toufik and Matthew Baker; 2011; John Wiley & Sons, Ltd.) [available at http://www.aldraji.com/download/The UMTS Long Term EvolutionB.pdf].

J. Nsenga, et. al., *Joint transmit and receive analog beamforming in 60 GHz MIMO multipath channels* (IEEE Proc. ICC; June 2009).

China Patent No. 102281642 granted Dec. 16, 2015 by Y. Zhou and Yong Wang entitled Method and Device for Allocating SRS Resource in LTE System.

US Patent Application Publication 2016/0020880 by Yingyang Li, Xiaoqiang Li, entitled "METHOD AND APPARATUS FOR TRANSMITTING SRS IN LTE TDD SYSTEM" (published Jan. 21, 2016).

3GPP TS 36.213 v14.1.0 (2016-12), section 8.2 entitled UE sounding procedure.

Also relevant to these teachings, in the development of the NR/5G technology, section 7.1.3.2 at page 103 of document R1-17_________ entitled Draft Report of 3GPP TSG RAN WG1 #87 v0.1.0 [3GPP TSG RAN WG1 Meeting #88; Athens, Greece; 13-17 Feb. 2017] cites to document R1-1613369 by Huawei, HiSilicon and Xinwei entitled WF on NR SRS [3GPP TSG RAN WG1 Meeting #87; Reno, USA; 14-18 Nov. 2016] when stating current agreements for the principles of SRS design (FFS means for further study):

In NR, SRS can be configurable w.r.t. density in frequency domain (e.g., comb levels) and/or in time domain (including multi-symbol SRS transmissions) Details FFS FFS details on how the set of port(s) and resources for SRS can be indicated by gNB The SRS is related to the radio resources on which it is sent (the 'resources for SRS' above) as well as to the beam/precoder indication. It is the SRS resource scheme that needs further study for adoption into NR/5G. The description below provides an enhanced SRS resource and beam/precoder indication scheme that is fully compatible with flexible resource density and beamforming/precoding for SRS, though these teachings are not limited to being deployed only in NR/5G systems.

There are at least two challenges related to beam reporting for m-MIMO type radio network that need to be addressed. As the UE moves through the network the beam pair for the active link may be changed. These changes are substantially more frequent, and there are many more beam pair possibilities, in m-MIMO systems. As one alternative operation of a m-MIMO network, if channel reciprocity exists between the uplink and downlink, the beam measurement results at the UE based on the downlink can be used for the uplink. Consider an example: the downlink beam pair can be determined by measurement of procedures P1/P2/P3 CSI-RS (where P1 measurements support selection of the TRP's TX beam and the UE's RX beam, P2 measurements support inter/intra TRP TX beams, and P3 measurements support changing the UE's RX beam). Then, the downlink receive/transmit beam can be used as the uplink transmit/receive beam. In such m-MIMO network, the beam management and CSI acquisition are made in two separate steps, and so the CSI acquisition for the link with an updated beam is slow. Due to that additional beam selection time this technique may be not suitable for successive packets transmission in a fast-fading m-MIMO environment. Furthermore, there is additional feedback overhead for reporting the UE's preferred beam selection results. One challenge for m-MIMO systems thus relates to fast uplink beam selection, which implies a fast CSI acquisition.

Another challenge is new to the NR/5G system and concerns how often SRS are sent; in NR/5G the density (frequency) for the SRS resources is to be configurable by the network. One possibility to implement this is to have the SRS function (for example, whether the SRS is used by the network for acquiring CSI or for beam management) agnostic to the UE; that is, the UE would not be aware of the function of any specific SRS. NR/5G introduces that there are multiple functions for the SRS such as CSI acquisition and beam management. If the function for which any particular SRS is put into use is agnostic to the UE then the UE would not be aware of that function, so for example the UE can transmit SRS according to the gNB's instruction without knowing the purpose for transmitting that SRS. Generally, the SRS density and the port number for SRSs used for beam management and SRSs used for CSI acquisition can be different, and it follows that the requirements of these functionalities are different. Therefore the SRS density, the frequency with which SRSs are transmitted, can be variable according to the actual desired function for them which the network decides dynamically.

Figure 2A:
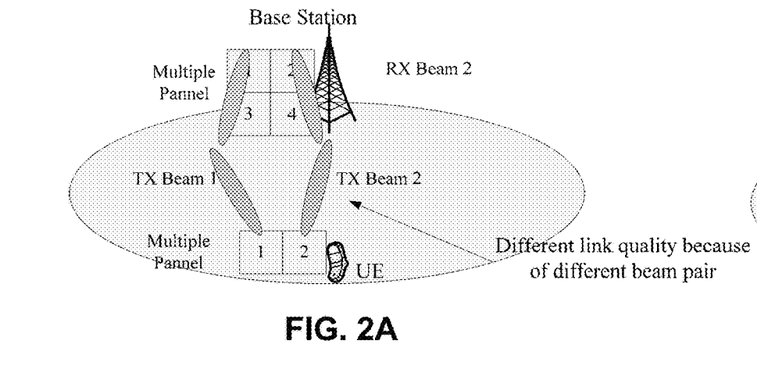
FIG. 2A is a schematic diagram illustrating a radio environment similar to FIG. 1 but with different panel beams of the UE pairing with different panel beams of the gNB to illustrate a UE agnostic function for SRS resource.

Now consider those challenges in view of some practical deployments to be adopted for NR/5G. FIG. 2A illustrates the radio environment of FIG. 1 but where the RRH+BBU entity is represented as the base station transmitting from multiple antenna panels to the UE which also transmits with multiple antenna panels (these antenna panels also receive). Multi-panel uplink transmissions are being studied for implementation in NR/5G systems and in this case the long term link quality can be different since different beams can be used for different panels as FIG. 2A shows. More specifically, in FIG. 2A the downlink beam from the base station's panel #1 is paired with the uplink beam from the UE's panel #1; and the downlink beam from the base station's panel #2 is paired with the uplink beam from the UE's panel #2, and these different beam pairs on different panels experience different link quality.

Figure 2B:
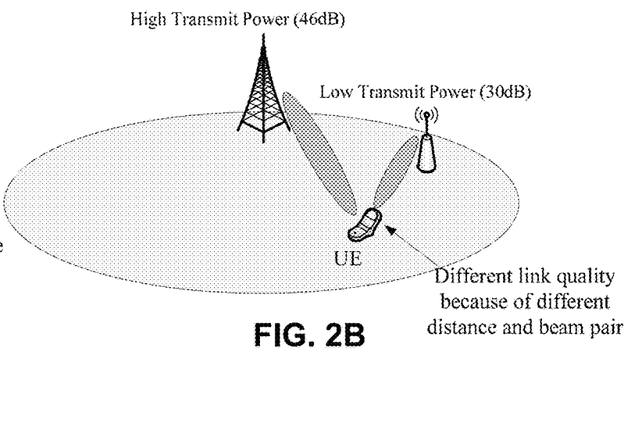
FIG. 2B is similar to FIG. 2A but with different distances between the UE and different TRPs for beam pairs to illustrate a heterogeneous network with multiple TRP reception at the UE.

FIG. 2B illustrates a different deployment to be adopted for NR/5G, namely a heterogeneous network with reception at the UE from multiple TRPs. With reference to FIG. 1 this may occur when the UE has active links with two different RRHs each associated with the same or even a different BBU and these two RRHs have different maximum transmit powers (macro cell versus pico cell, for example). Between the UE and these multiple TRPs, the long term link quality can be different because the transmit/receive beam pair and the distance between the UE and each different TRP may be different.

Both environments of FIGS. 2A and 2B can exist in the NR/5G system, and so to guarantee that the quality of the channel estimation is sufficient for the finer beamforming needed in NR/5G, there can be different densities of SRS transmissions as different link quality for different beam pairs in those two environments.

This drives the need for the enhanced SRS resource indication scheme described herein, where the UE's preferred beam and/or precoder are implicitly reported together with the SRS transmission that traditionally means the UE has acquired the CSI-RS. Also detailed below is a dynamic indication scheme for the SRS density, where there is a bit map indication for multiple SRS resources and a per port/port group indication for one SRS resource.

Figure 3A:
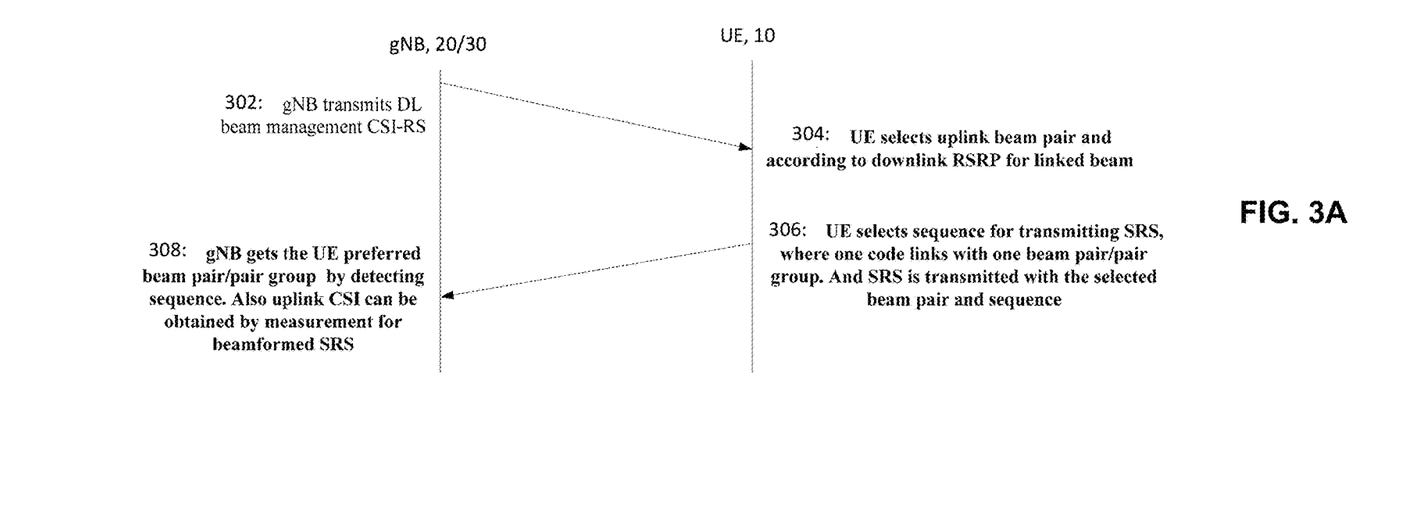
FIG. 3A is a signaling diagram outlining a procedure for implicit signaling of the UE's preferred uplink beam via a SRS sequence according to certain non-limiting embodiments of these teachings.
Figure 3B:
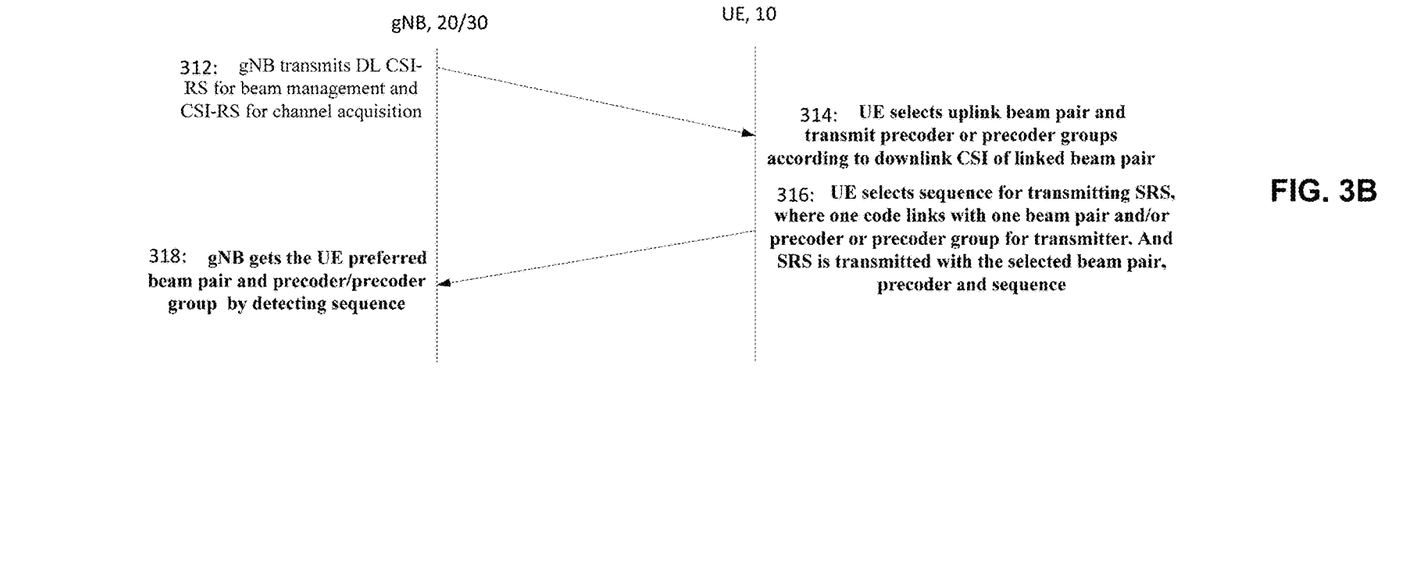
FIG. 3B is a signaling diagram outlining a procedure for implicit signaling of the UE's preferred uplink beam and of the precoder via a SRS sequence according to certain non-limiting embodiments of these teachings.

Embodiments of these teachings provide an enhanced SRS resource indication scheme which can work well for m-MIMO systems that use highly flexible beamforming. Two different aspects of the examples described herein make this particularly suitable for a deployment in a practical MIMO wireless radio network. First, the described SRS resource indication scheme is characterized by low delay and overhead for reporting the UE's preferred beam (FIG. 3A) and/or preferred precoder (FIG. 3B). Second, this SRS resource indication scheme is particularly suitable for m-MIMO networks with large numbers of antennas in that there is a dynamic indication of SRS overhead according to the actual desired function and link quality, and thus is well adapted to mmWave type radio links that are particularly prone to fast fading and fine beamforming.

Consider first the UE reporting its preferred beam and/or precoder. In this regard the UE assists the network in choosing the best beam pair or pairs by implicitly indicating a beam pair and/or precoder. When the beam pair for uplink transmission is changed, as mentioned above conventional prior art wireless networks typically have the beam management and CSI acquisition reports made separately. To reduce delay and feedback overhead, in embodiments of these teachings the UE's preferred beam selection information can be carried together with SRS for CSI acquisition.

More specifically, in embodiments of these teachings the UE chooses a particular SRS sequence which implicitly reports the UE's preferred beam selection. More generally this particular sequence can be any uplink reference signal such as a demodulation reference signal DMRS or a PRACH sequence such as a Zadoff-Chu sequence or an m-sequence used for a scheduling request (or more generally a scheduling request signal); the examples below specifically use a SRS sequence only as a non-limiting example. FIG. 3A is an example signaling diagram showing a procedure implementing this aspect of the invention. At step 302 the gNB transmits downlink a beam management reference signal such as a CSI reference signal (CSI-RS) for procedures P1/P2/P3. At step 304 of FIG. 3A the UE determines its preferred uplink beam according to the UE's measurement results of that downlink beam management CSI-RS. That measurement result may be in terms of RSRP or RSRQ for example.

Not shown in FIG. 3A but underlying the signaling that it does show, there is an implicit linkage between a given SRS sequence that the UE selects/transmits and a given uplink beam to pair with the downlink beam on which the reference signal was sent. The UE knows the downlink beams on which it received the CSI-RS and knows the RSRP it measured for that CSI-RS on each different downlink beam on which it was received. In one example the UE chooses its uplink beam as follows. The UE chooses its most preferred uplink beam to match with the downlink beam on which the UE measured the best/highest RSRP, and this is the uplink beam that the UE will report to the network.

In one implementation of these teachings both the gNB and the UE have in their local memory an association table of uplink beam/beam pairs with SRS sequences. Table 1 is a simplified example in which there are four sequences linked with four possible beam pairs, where xi represents the UE's transmit/uplink beam index and yi represents the UE's receive/downlink beam index. The corresponding sequences that the UE transmits with the SRS implicitly map to the beam pair.

TABLE 1

Example beam pairs and corresponding SRS sequence

| Uplink/Downlink beam pair | sequence |
|---|---|
| {x1, y1} | 1001101 |
| {x1, y2} | 1000001 |
| {x2, y1} | 0010110 |
| {x2, y2} | 0101100 |

To reduce the number of sequences, the beam pair group can be linked with SRS transmit sequence, where the beam pairs with the same uplink transmit beam are put in one group. So for example in the above Table 1 thee would be only two entries, each one corresponding to one of the UE's two uplink beams and one entry would correspond to the group {x1, y1} {x2, y1} while the other sequence corresponds to the group {x1, y2}{x2, y2}. The network knows which beam it send the downlink CSI-RS, and so the effect of this embodiment is to use a fewer number of sequences for the implicit signaling.

Then at step 306 of FIG. 3A, the UE transmits the SRS which is the selected SRS sequence that maps to the selected beam pair (or beam group that includes the selected beam pair). This SRS sequence that the UE transmits can also be used for CSI acquisition by the gNB. Then at step 308 the gNB can determine the UE preferred beam pair/beam group by detecting that SRS sequence. This means that a set of sequences are specified and used according to a specified criteria, such as RSRP of the measured beam in downlink. At the same time, the linked uplink CSI can be obtained by network by doing a channel estimation based on this SRS sequence. In this regard the UE's preferred beam selection results can be implicitly signaled, and obtained at the network by detection of the SRS sequence that the network uses to acquire uplink CSI which it will need to do anyway. The delay and feedback overhead in the prior art caused by the UE reporting its beam selection results are eliminated in this technique.

More generally, the UE can obtain the uplink precoder from the downlink CSI-RS for channel acquisition, if this CSI-RS that the UE measures is transmitted in a manner that is linked with the selected beam. An example signaling diagram for this procedure is shown at FIG. 3B. Precoders are well known in the radio arts, and in an example such a precoder can be the digital precoding matrix (vector) based on selected beam. In a practical deployment this CSI-RS for channel acquisition may also be used for channel estimation by other UEs. The gNB at step 312 transmits two CSI-RSs, a first one is for beam management (for example, for P1/P2/P3 measurements as described in the background section) and is consistent with that described above for FIG. 3A; the second is for channel measurement (for example, with beamforming by the candidate beams that are used by the CSI-RS for beam management). At step 314 the UE measures CSI from the CSI-RS for channel acquisition/measurement, and determines its preferred uplink beam/beam pair as detailed above for FIG. 3A. But in the case of FIG. 3B the table will also have a precoder, such that selection of a given SRS sequence for a given uplink beam or beam pair will also implicitly identify a precoder value or a range of precoders (for example, high range of precoders, low range of precoders). In this regard the stored table will associate a SRS sequence with a) a beam pair or beam group; and b) a precoder or precoder range. Table 2 shows this for four SRS sequences, where each sequence corresponds to the same beam pair but to a unique precoder index. Precoder indices are well known in the art (see for example table 5.3.3A2-1 at section 5.3.3A.2 of 3GPP TS 36.211 where different PMIs are given for different transmission ranks and numbers of antenna ports).

TABLE 2

Example precoder-specific beam pairs and corresponding SRS sequence

| Precoder index | Uplink/Downlink beam pair | sequence |
| --- | --- | --- |
| {P1} | {x1, y1} | 1001101 |
| {P2} | {x1, y1} | 1000011 |
| {P3} | {x1, y1} | 0110110 |
| {P4} | {x1, y1} | 0100100 |

Table 2 makes clear that a given SRS sequence implicitly maps to the UE's preferred/recommended uplink beam/beam pair (or beam group) as well as its recommended precoder value/index (or range of values/indices). At step 316 of FIG. 3B the UE selects one of these SRS sequences and reports it to the network; the gNB detects this SRS sequence at step 318 and from a similar table 2 stored in its own memory learns the UE's preferred uplink beam or beam pair and suggested precoder value. Not shown at FIG. 3B, the network/gNB uses this precoder value when it next sends a transmission to the UE.

The SRS is used by the network to measure uplink channel quality over a certain bandwidth, and at least in the LTE system transmission of the SRS is not associated with transmission of a PUSCH or PUCCH but it is sent according to bandwidth and subframe configurations that are set forth in system information and also the UE-specific aspects are given to the UE when it sets up a connection. Thus in the LTE system the resources ion which SRS can be sent are statically configured.

In the NR/5G system SRS resources are configured more dynamically due to the fact they are to take on multiple different functions as mentioned above, and the need for these various functions will vary over time much more often than the LTE systems' need for estimating quality of the uplink channel. The UE agnostic functions for SRS, the multiple panel uplink transmissions described with reference to FIG. 2A, and the multiple TRP reception described with reference to FIG. 2B all drive the need in NR/5G systems for dynamically adjusting the density of SRS resources.

To efficiently use the SRS resources, the network can dynamically adjust the SRS density according to actual functions being put into use and link quality. But these changes need to be signaled to the UE so it knows to send its SRS in the uplink radio resource at which the network will expect it, and the proper uplink resource depends on the SRS density currently in use.

Figure 4A:
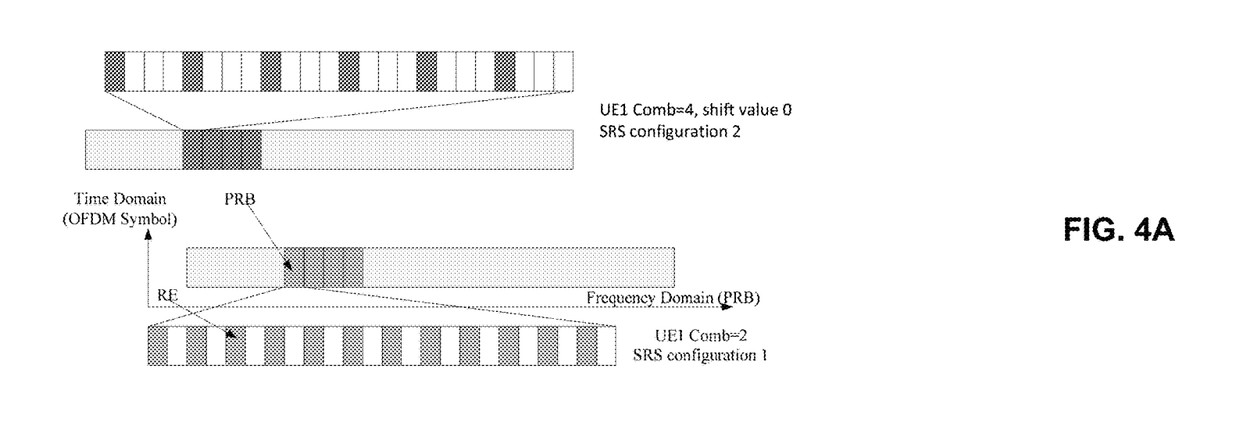
FIG. 4A is a schematic diagram of two radio frames each with one physical resource block PRB expanded into 12 OFDM symbols and each showing a different comb value.

In the LTE system the SRSs of different UEs could be interleaved within the allowed SRS bandwidth, and that allowed bandwidth could be the full bandwidth or only a few resource blocks. These interleaved SRSs are referred to as an SRS comb. FIG. 4A is a schematic diagram of two radio frames each with one physical resource block PRB expanded into 12 OFDM symbols and each showing a different comb value. The upper portion is labelled SRS configuration 2 which has a comb value of 4 and a shift value of zero for this UE of zero; as shown in the expanded OFDM symbols the UE sends its SRS every 4 OFDM symbols in the relevant PRB, and the offset is zero so it begins in the first symbol of the PRB. The lower portion is labelled SRS configuration 1 which has a comb value of 2 (the shift value is not specifically stated but is also zero) for this UE; as shown in the expanded OFDM symbols the UE sends its SRS every 2 OFDM symbols in the relevant PRB beginning with the first symbol of the PRB. To signal the UE of changes to the SRS density, in an embodiment of these teachings there is an indication of the SRS Comb that is included in SRS transmit resources indication. It can be included in the triggering signaling which is communicated to the UE in the PDCCH. In one specific embodiment there is a 1-bit indication for this purpose and it is used to switch between two SRS Comb values, for example the two comb values of FIG. 4A.

Figure 4B:
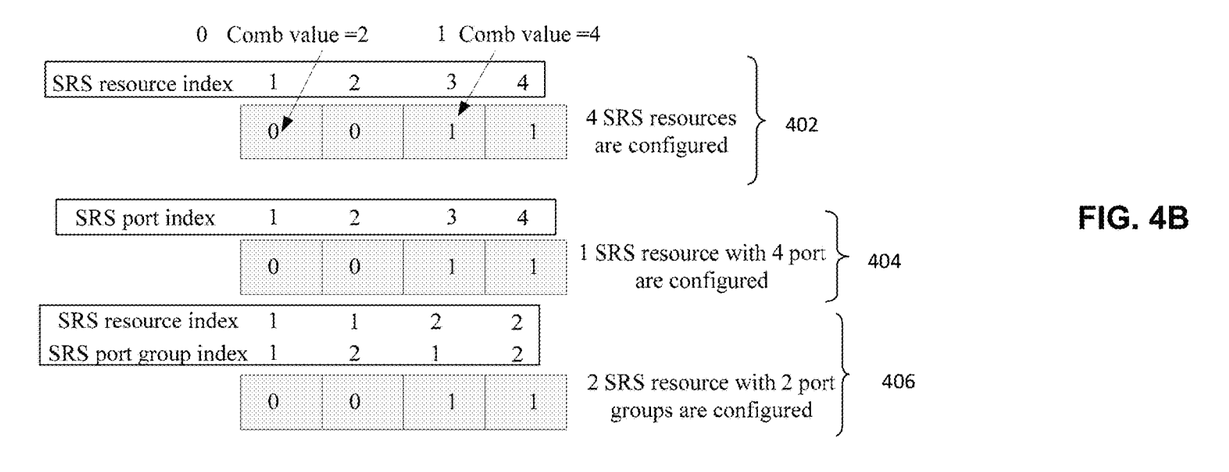
FIG. 4B is a conceptual rendering of a unified design for per port density indication and density indication for multiple SRS resources according to certain non-limiting embodiments of these teachings to enable dynamic signaling for SRS density.

FIG. 4B provides three examples for extension of indication of SRS density. Table 402 shows four SRS resources are configured (indexed as 1, 2, 3, 4) and there are two possible SRS densities given by the bit values 0 and 1 which mean SRS comb value=2 and =4, respectively. Table 404 illustrates an example where there is only one SRS resource configured but there are four SRS ports, and the value of the bit indicates the comb value for each port. Table 406 is a hybrid combination of these two other tables and assumes two SRS resources are configured and there are two different SRS ports (or port groups). For the first SRS resource SRS is transmitted from port 1 and from port 2 with comb value 2; whereas for the second SRS resource SRS is transmitted from port 1 and port 2 with comb value 4. Table 402-406 represent the example of a unified design for per port density indication and density indication for multiple SRS resources.

If multiple SRS resources are configured as at table 402 and 406, the SRS density can be indicated by a bit map. In this regard the total number of bits would be a fixed value, which is related with the maximum supported SRS resource number in the published specifications that control operation on the relevant radio access technology. If one SRS resource is configured such as at table 404, a different density (Comb value for example) can be configured for each port so for example table 404 would apply for port#1 and a similar table would apply for port#2 and so forth. In this case, only the ports with the same Comb value can be multiplexed by means of code-division multiplexing (CDM since the same SRS sequence length could ensure orthogonality). In one embodiment the Comb index can be configured by high layers (above the gNB level) similar to how the LTE system handles the Comb index configuration.

Figure 5:
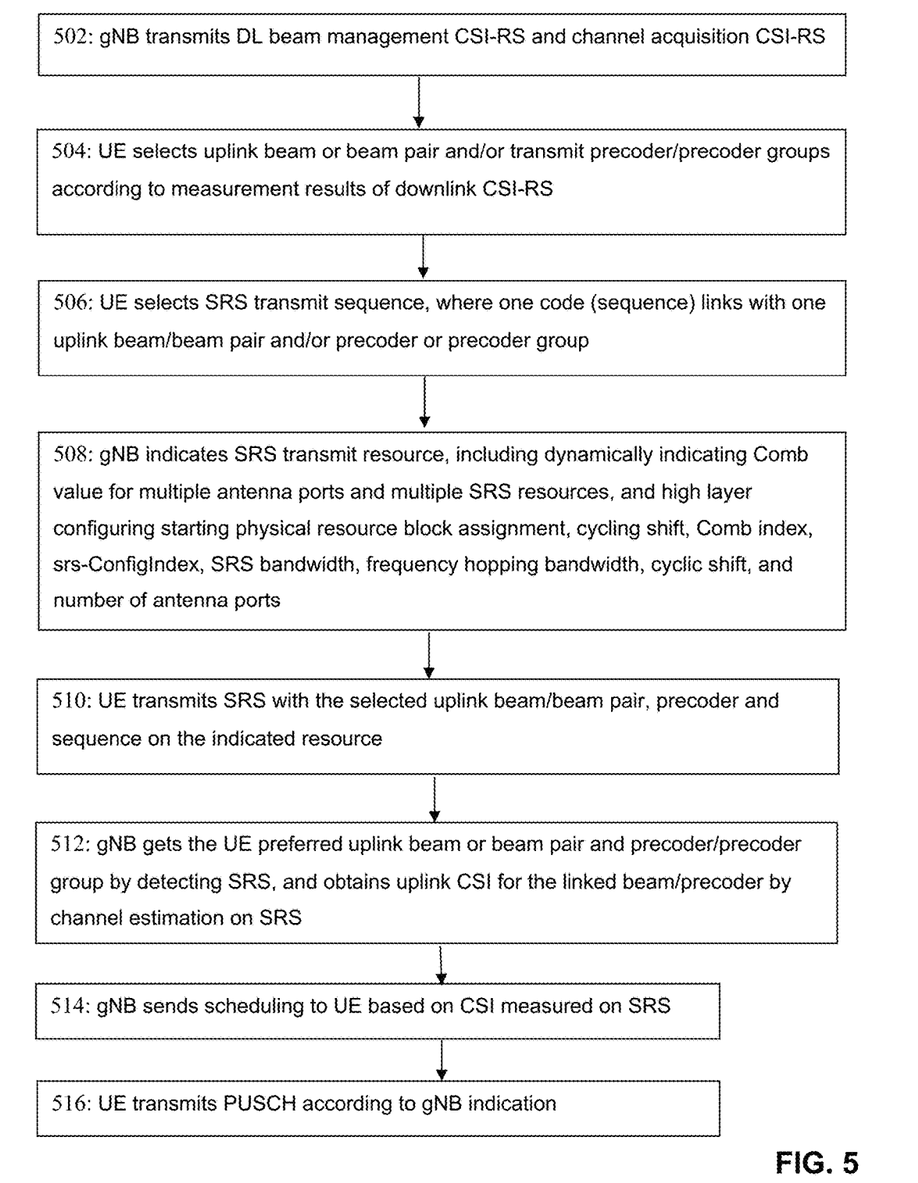
FIG. 5 is a process flow diagram summarizing certain aspects of the invention showing different actions by a radio network/gNB and a user equipment UE, as well as how these actions interrelate and depend from one another.

From the details above the UE's preferred beam and/or precoder is implicitly reported via the SRS sequence, and in the different examples this could be done in one SRS transmission for both beam management and CSI acquisition. For the configurable SRS resource density there is a dynamic indication of SRS overhead according to desired function and link quality. In one implementation there is a bit map indication for multiple SRS resources, and in another there is a per port/port group indication for one SRS resource. FIG. 5 is a flow diagram that summarizes certain of these aspects with regard to actions taken by the radio network (specifically the gNB) and the UE.

The overall process begins at block 502 at which the gNB transmits DL beam management CSI-RS and channel acquisition CSI-RS. At block 504 the UE selects an uplink beam or beam pair and/or transmit precoder/precoder groups according to measurement results of downlink CSI-RS, then at block 506 the UE selects a SRS transmit sequence, where one code (sequence) links with one beam pair and/or precoder or precoder group that was selected at block 504. Block 508 returns the action to the gNB which indicates SRS transmit resource, including dynamically indicating Comb value for multiple antenna ports and multiple SRS resources, and high layer configuring starting physical resource block assignment, cycling shift, Comb index, srs-ConfigIndex, SRS bandwidth, frequency hopping bandwidth, cyclic shift, and number of antenna ports. At block 510 the UE transmits what it selected at block 506, namely its SRS with the selected beam pair, precoder and sequence on the indicated resource. At block 512 the gNB gets/determines the UE preferred beam pair and precoder/precoder group by detecting SRS sequence with the implicit principle as detailed above, and the gNB also obtains uplink CSI for the linked beam/precoder by channel estimation on SRS. To put this all in context, block 514 has the gNB sending scheduling (such as a PDCCH that allocates to the UE a PUSCH) to the UE based on CSI measured on the SRS, and the UE transmits at block 516 a PUSCH according to the gNB indication at block 514.

These teachings offer several technical effects, for example implementing the SRS indication scheme as detailed herein results in a low feedback delay and low overhead for reporting the UE's preferred beam pair and precoder by carrying this information implicitly with the RS sequence. Another technical effect is the result of low SRS overhead by the described dynamic density indication. Further, sequence detection is required in order for the network to determine the UE's preferred beam/precoder index, and there is additional dynamic signaling overhead for indicating the SRS density (Comb value in the examples above).

Certain embodiments of these teachings may be made manifest in an apparatus comprising at least one processor and at least one memory tangibly storing a computer program; wherein the at least one processor is configured with the at least one memory and the computer program to cause the apparatus to perform in one embodiment the specific process steps shown at FIG. 5 for the gNB and in another embodiment those shown specific process steps shown at FIG. 5 for the UE, and these process steps are more fully detailed above. Such embodiments can also be made manifest in a computer readable memory tangibly storing a computer program that when executed causes a host gNB or user equipment to perform the process shown for the respective gNB or UE at FIG. 5 and as more fully detailed above.

In one embodiment blocks 502, 508, 512 and 514 of FIG. 5 can be considered as an algorithm, and more generally represents steps of a method, and/or certain code segments of software stored on a computer readable memory or memory device that embody that algorithm for implementing these teachings from the perspective of the gNB (base station/radio access node, radio network controller, or similar). Similarly, in another embodiment blocks 504, 506, 510 and 516 of FIG. 5 can be considered as an algorithm, steps of a method, and/or code segments of software stored on a computer readable memory or memory device that embody that algorithm for implementing these teachings from the perspective of a mobile radio device such as a user equipment. In this regard the invention may be embodied as a non-transitory program storage device readable by a machine such as for example one or more processors of a radio network access node (including one or multiple TRPs) or of a UE, where the storage device tangibly embodies a program of instructions executable by the machine for performing operations such as those of the algorithms mentioned above.

Figure 6:
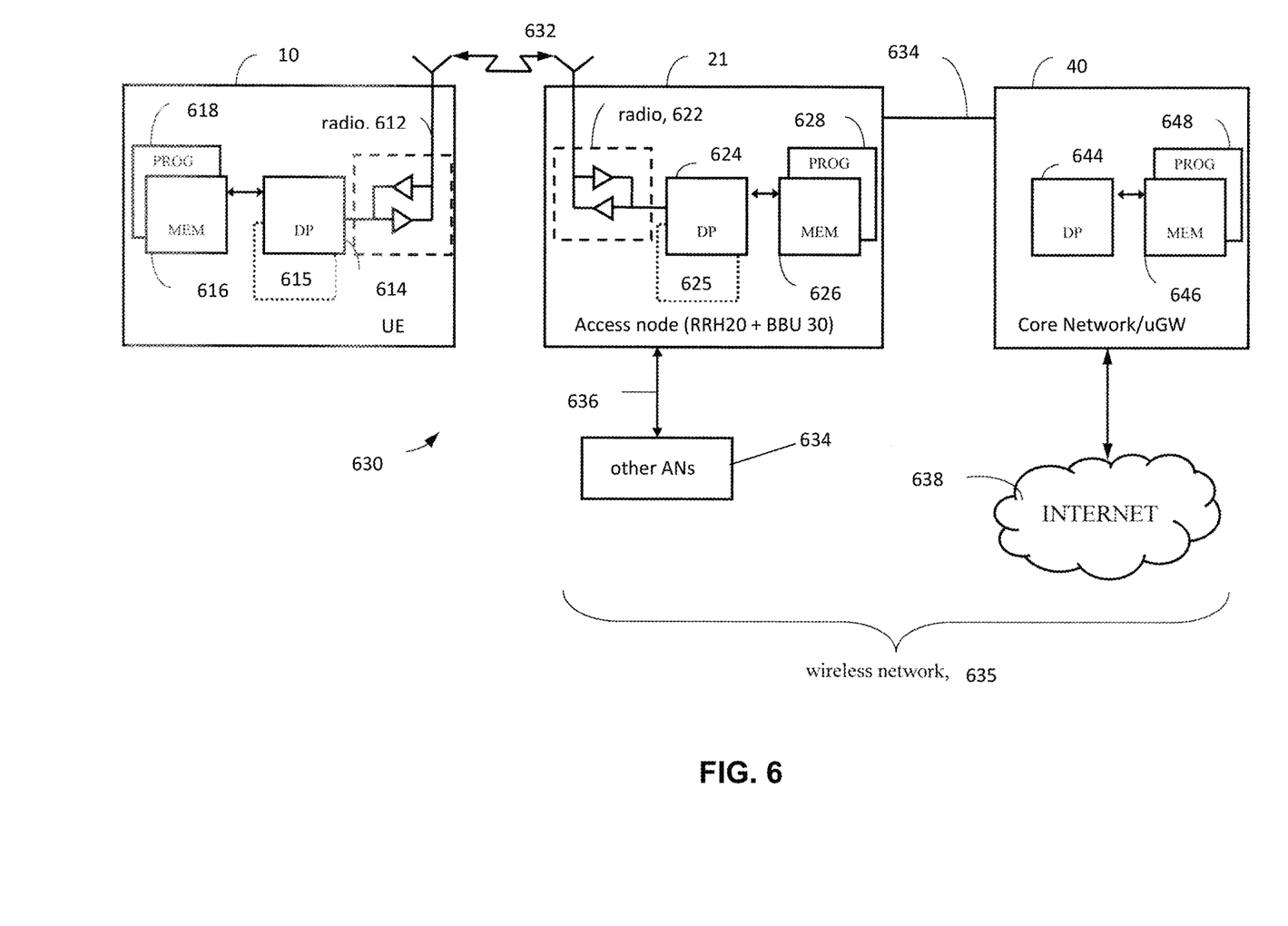
FIG. 6 is a diagram illustrating some components of certain entities of a radio network and components of a UE/mobile device, suitable for practicing various aspects of the invention.

FIG. 6 is a high level diagram illustrating some relevant components of various communication entities that may implement various portions of these teachings, including a base station identified generally as a radio network access node 21 (shown at FIG. 1 as the RRH 20 plus the BBU 30), a core network which may also be co-located with a user-plane gateway (uGW) 40, and a user equipment (UE) 10. In the wireless system 630 of FIG. 6 a communications network 635 is adapted for communication over a wireless link 632 with an apparatus, such as a mobile communication device which may be referred to as a UE 10, via a radio network access node 21. The core network 635 may include a Serving- or User-GW 40 that provides connectivity with other and/or broader networks such as a publicly switched telephone network and/or a data communications network (e.g., the internet 638).

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 21 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 21 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio network access node 21 is coupled via a data/control path 634 to the core network 40. In certain 5G deployments prior to the point 5G can stand alone it may be that the gNB 21 is coupled to an eNB of a LTE system according to a NR-LTE interworking arrangement, in which case the core network is likely to be the eNB's. However deployed, the radio network access node 21 may also be coupled to other radio network access nodes (ANs) 634 via data/control path 636.

The core network 40 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the radio network access node 21; and/or by hardware, or by a combination of software and hardware (and firmware).

For the purposes of describing various exemplary embodiments in accordance with this invention the UE 10 and the radio network access node 21 may also include dedicated processors 615 and 625 respectively.

The computer readable MEMs 616, 626 and 646 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
    BBU baseband unit
    BS Base Station
    CDM code division multiplexing
    CSI channel state indication
    eMBB enhanced mobile broadband
    E-UTRAN evolved UMTS radio access network
    gNB base station of a 5G system
    LTE long term evolution (of E-UTRAN; also referred to as 4G)
    m-MIMO Massive Multiple-Input Multiple Output
    NR new radio (also referred to as 5G)
    PRACH physical random access channel
    PUSCH physical uplink shared channel
    RRH remote radio head
    RS reference signal
    RSRP reference signal received power
    RSRQ reference signal received quality
    RX receive
    SRS sounding reference signal
    TRP Transmission-Reception point TX transmit
UMTS universal mobile telecommunications service
URLLC ultra-reliable low-latency communication

What is claimed is:

1. A method comprising:
   transmitting a reference signal on a downlink beam to a user equipment;
   receiving from the user equipment a reference signal sequence;
   determining from the received reference signal sequence at least one preferred uplink beam to pair with the downlink beam, wherein the at least one preferred uplink beam is determined based on measurement results of a channel state information reference signal for the downlink beam;
   sending downlink signaling to the user equipment on at least the downlink beam; and
   receiving uplink signaling from the user equipment on the at least one preferred uplink beam.

2. The method according to claim 1, wherein the reference signal sequence received from the user equipment is one of a sounding reference signal, a demodulation reference signal, a scheduling request signal, and at least one of a Zadoff-Chu sequence and an m-sequence on a physical random access channel.

3. A non-transitory computer readable memory tangibly storing a computer program that when executed causes a host radio network access node to perform the method according to claim 1.

4. An apparatus comprising:
   at least one processor, and
   at least one memory tangibly storing a computer program;
   wherein the at least one processor is configured with the at least one memory and the computer program to cause the apparatus to:
      transmit a reference signal on a downlink beam to a user equipment;
      receive from the user equipment a reference signal sequence;
      determine from the received reference signal sequence at least one preferred uplink beam to pair with the downlink beam, wherein the at least one preferred uplink beam is determined based on measurement results of a channel state information reference signal for the downlink beam;
      send downlink signaling to the user equipment on at least the downlink beam; and
      receive uplink signaling from the user equipment on the at least one preferred uplink beam.

5. The apparatus according to claim 4, wherein the reference signal sequence received from the user equipment is one of a sounding reference signal, a demodulation reference signal, a scheduling request signal, and at least one of a Zadoff-Chu sequence and an m-sequence on a physical random access channel.

6. The apparatus according to claim 4, wherein the reference signal transmitted on the downlink beam is a beam management reference signal and the reference signal sequence received from the user equipment is a sounding reference signal.

7. The apparatus according to claim 6, further comprising measuring uplink channel state information from the received sounding reference signal.

8. The apparatus according to claim 6, wherein the downlink signaling comprises an indication of density of sounding reference signal resources.

9. The apparatus according to claim 4, further comprising:
   transmitting a channel acquisition reference signal, and wherein:
      determining at least the preferred uplink beam further comprises determining a precoder or a precoder group from the sounding reference signal; and
      using the precoder or one precoder selected from the precoder group when sending the downlink signaling.

10. The apparatus according to claim 9, wherein the indication is at least one of:
    a bitmap indicating a comb value for each one of multiple allocated sounding reference signal resources; and
    a comb value for each of multiple antenna ports.

11. The apparatus according to claim 4, wherein a radio network access node operating in a massive multiple input multiple output radio network, or portions thereof comprises the apparatus.

12. A method comprising:
    receiving a reference signal from a radio network on a downlink beam;
    selecting at least one preferred uplink beam to match the downlink beam, wherein the at least one preferred uplink beam is determined based on measurement results of a channel state information reference signal for the downlink beam;
    selecting a reference signal sequence that corresponds to the selected at least one preferred uplink beam;
    transmitting the selected reference signal sequence to the radio network;
    receiving downlink signaling from the radio network on at least the downlink beam; and
    transmitting uplink signaling to the radio network on the at least one preferred uplink beam.

13. A non-transitory computer readable memory tangibly storing a computer program that when executed causes a host user equipment to perform the method according to claim 12.

14. An apparatus comprising:
    at least one processor, and
    at least one memory tangibly storing a computer program;
    wherein the at least one processor is configured with the at least one memory and the computer program to cause the apparatus to:
       receive a reference signal from a radio network on a downlink beam;
       select at least one preferred uplink beam to match the downlink beam, wherein the at least one preferred uplink beam is determined based on measurement results of a channel state information reference signal for the downlink beam;
       select a reference signal sequence that corresponds to the selected at least one preferred uplink beam;
       transmit the selected reference signal sequence to the radio network;
       receive downlink signaling from the radio network on at least the downlink beam; and
       transmit uplink signaling to the radio network on the at least one preferred uplink beam.

15. The apparatus according to claim 14, wherein the selected reference signal sequence is one of a sounding reference signal, a demodulation reference signal, a scheduling request signal, and at least one of a Zadoff-Chu sequence and an m-sequence on a physical random access channel.

16. The apparatus according to claim 14, wherein the reference signal received on the downlink beam is a beam management reference signal and the selected reference signal sequence is a sounding reference signal.

17. The apparatus according to claim 16, wherein the at least one processor is configured with the at least one memory and the computer program to cause the apparatus to:
  receive a channel acquisition reference signal, wherein the sounding reference signal is selected further to correspond to a precoder or a precoder group.

18. The apparatus according to 16, wherein the received downlink signaling comprises an indication of density of sounding reference signal resources.

19. The apparatus according to claim 18, wherein the indication is at least one of:
  a bitmap indicating a comb value for each one of multiple allocated sounding reference signal resources; and
  a comb value for each of multiple antenna ports.

20. The apparatus according to claim 14, wherein a user equipment operating in a massive multiple input multiple output radio network, or portions thereof comprises the apparatus.

\* \* \* \* \*